United States Patent [19]

Oka

[11] 4,196,913
[45] Apr. 8, 1980

[54] GASKETS

[75] Inventor: Toshio Oka, Kagawa, Japan

[73] Assignee: Kosaku UEDA, Urawa, Japan

[21] Appl. No.: 774,398

[22] Filed: Mar. 4, 1977

[30] Foreign Application Priority Data

Jul. 14, 1976 [JP] Japan .............................. 51-94100[U]
Feb. 8, 1977 [JP] Japan .............................. 52-14155[U]

[51] Int. Cl.$^2$ ................................................. F16J 15/08
[52] U.S. Cl. .................................. 277/235 B; 277/236
[58] Field of Search .............. 277/166, 193, 194, 196, 277/198, 199, 235 B, 236, 233, 232, 231

[56] References Cited

U.S. PATENT DOCUMENTS

| | | | |
|---|---|---|---|
| 864,419 | 8/1907 | Grey | 277/231 |
| 1,643,561 | 9/1927 | Kinzel | 277/231 |
| 1,851,948 | 3/1932 | Summers | 277/213 |
| 2,134,868 | 11/1938 | Fitzgerald | 277/235 B |
| 2,397,597 | 4/1946 | Dunkle | 277/213 |

*Primary Examiner*—Robert I. Smith

*Attorney, Agent, or Firm*—Saul Jecies

[57] ABSTRACT

A gasket consists of a base plate made of a thin, hard sheet such as a metal, hard rubber and/or plastic sheet and formed with one or a plurality of radially spaced apart ondulations surrounding a hole cut through the base plate so that elasticity may be imparted thereto, and overlaid on the major surfaces of the base plate are surface plates the same as or substantially similar in configuration to the base plate and made of a thin sheet having a hardness equal to or slightly less than the hardness of the base plate. According to one embodiment, auxiliary plates made of a sheet with a hardness substantially equal to that of the base plate are interposed between the base plate and the surface plates. Under the compressive load, the ondulations elastically resist the compression so that the mating surfaces of, for instance, a cylinder block and a cylinder head may be gas-tightly sealed under uniform pressure regardless of distortions of the mating surfaces due to temperature differences and the tightening force.

5 Claims, 10 Drawing Figures

GASKETS

BACKGROUND OF THE INVENTION

The present invention relates to gaskets to make a highly reliable pressure-tight joint between stationary parts at elevated temperatures and under high pressure.

In general, cylinder-head gaskets which are placed between cylinder blocks and cylinder heads have been fabricated by punching into a suitable configuration a gasket-sheet consisting of a wire gauze or metal sheet formed with hooks which is coated with asbestos or a rubber-asbestos mixture or a soft sheet consisting of a mixture of rubber and asbestos. The cylinder-head gaskets are generally subjected to high temperatures, and a considerably high temperature difference between an inlet port and an exhaust port causes thermal distortions of the mating surfaces of the cylinder block and the cylinder head and consequently the pressures acting on these mating or joint surfaces change from one point to another. However, since the cylinder-head gaskets are flat, they cannot absorb the thermal distortions of the mating or joint surfaces so that gas, water and oil leakages result.

Furthermore the unsuitable selection of the positions of studs joining the cylinder head and cylinder block, with respect to bores result in the uneven pressure distributions between the mating surfaces so that the pressure-tight joint effect is adversely affected. To solve this problem, the bolt-tightening force is increased to increase the pressures acting on the cylinder-head gasket, but this method frequently results in excessive pressures exceeding a limit of the gasket. As a consequence, the gasket is partially broken or collapsed, resulting in gas, oil or water leakage.

In addition, the conventional gaskets containing rubber have been presenting a pollution problem because not only the recovery of rubber from the gaskets is impossible but also there has been no suitable disposal method for wasted gaskets.

Therefore there has been a growing demand for gaskets which may ensure a highly reliable pressure-tight joint between the cylinder head and cylinder block even when the thermal distortions occur.

SUMMARY OF THE INVENTION

One of the objects of the present invention is therefore to provide gaskets which may assure a highly reliable pressure-tight joint between stationary parts by absorbing the surface roughness of the mating surfaces and the distortions thereof caused by the uneven distribution of joining forces or pressures and partial collapses of the gasket.

Another object of the present invention is to provide gaskets formed with ondulations surrounding a part of mating surfaces.

A further object of the present invention is to provide gaskets which may be recovered after their use and for this purpose are made of metal sheets, whereby the re-use of precious natural resources may be effected.

A further object of the present invention is to provide gaskets which may not cause any pollution problem at all when disposed.

To the above and other ends, the present invention provides a gasket consisting of a base plate punched from a hard, thin sheet and formed with one or a plurality of closed ondulations surrounding openings or holes defined by the base plate so that elasticity may be imparted to the base plate, and one or two surface plates made of a thin sheet with a hardness substantially equal to or slightly less than the hardness of the base plate and overlaid upon one or both major surfaces of the base plate. According to one preferred embodiment, interposed between the base plate and the surface plates are auxiliary plates made of a thin sheet with a hardness substantially equal to or slightly less than the hardness of the base plate. Under the compressive load, the ondulations of the base plate elastically resist the compression so that the mating surfaces may be pressure-tightly joined together under uniform pressure even when they are thermally or otherwise distorted.

The above and other objects, features and advantages of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
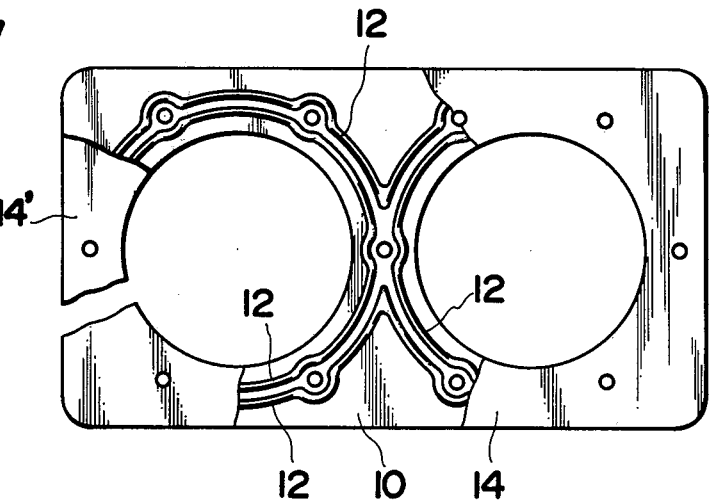
FIG. 1 is a top view with parts broken away of a first embodiment of a gasket in accordance with the present invention.
Figure 2:
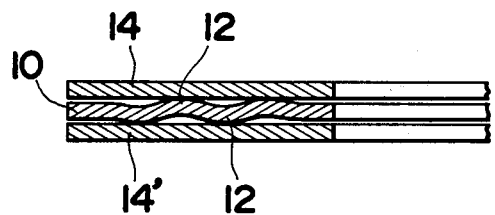
FIG. 2 is a fragmentary sectional view thereof.
Figure 3:
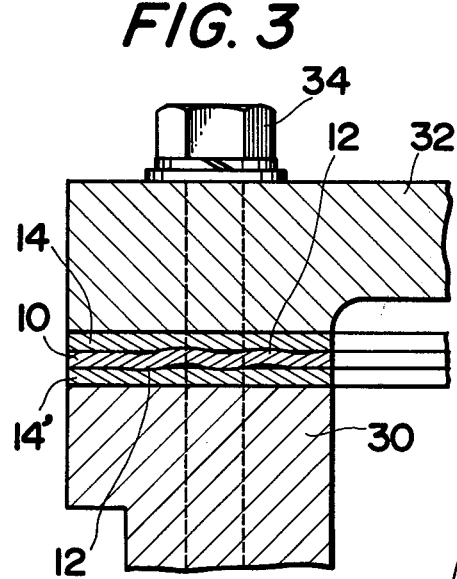
FIG. 3 is a fragmentary sectional view thereof when placed between a cylinder block and a cylinder head.

First Embodiment, FIGS. 1, 2 and 3

A gasket shown in FIGS. 1, 2 and 3 comprises a base plate 10 and surface plates 14 and 14' overlaid on the major surfaces of the base plate 10. The base plate 10 is provided by punching a hard, thin metal plate such as a carbon, tool or stainless sheet and is formed with ondulations 12 surrounding holes in order to impart (the surface) elasticity to the base plate 10. The surface plates 14 and 14' may be made of the same metal as the base plate 10 or a thin metal sheet slightly softer than the base plate 10, and may be punched into a shape same with or substantially similar to that of the base plate 10.

The gasket may be placed for instance between a cylinder block 30 and a cylinder head 32. When bolts 34 are tightened, the ondulations 12 are expanded or depressed against the tightening force and are forced to press against the surface plates 14 and 14' as shown in FIG. 3. Even though the mating surfaces of the cylinder block and head are subjected to slight distortions, they are pressed against each other through the gasket under uniform pressure because of the elasticity provided by the ondulations 12. In addition, the ondulations continuously surround the holes for the compression chamber so that reliable sealing may be ensured.

The gasket prevents the excess tightening of the stud bolts 34 so that distortions of the cylinder block 30 and the cylinder head 32 may be prevented.

Figure 4:
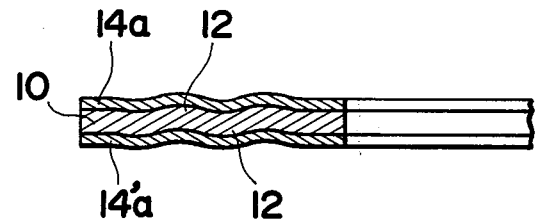
FIG. 4 is a fragmentary sectional view of a second embodiment of the present invention.

Second Embodiment, FIG. 4

A gasket shown in FIG. 4 is substantially similar in construction to the first embodiment shown in FIGS. 1, 2 and 3 except that the surface plates 14a and 14a' are also ondulated.

When the gasket is placed between the cylinder block 30 and the cylinder head 32 and the bolts 34 are tightened, the ondulations 12 resist the compression so that the mating surfaces of the gasket and the cylinder block 30 and the cylinder head 32 are pressed against each other under uniform pressure even though they are subjected to slight distortions.

Third Embodiment, FIGS. 5 through 8

Figure 5:
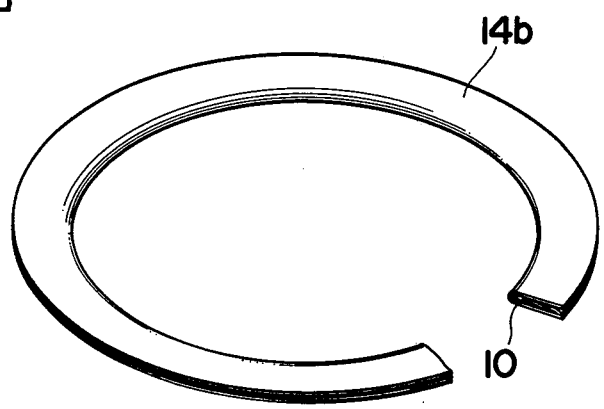
FIG. 5 is a perspective view, with a part broken, of a third embodiment of the present invention.
Figure 6:
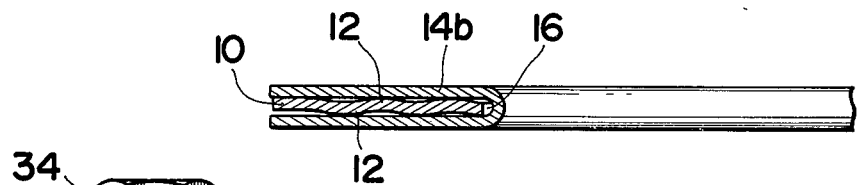
FIG. 6 is a fragmentary sectional view, on an enlarged size, thereof.
Figure 7:
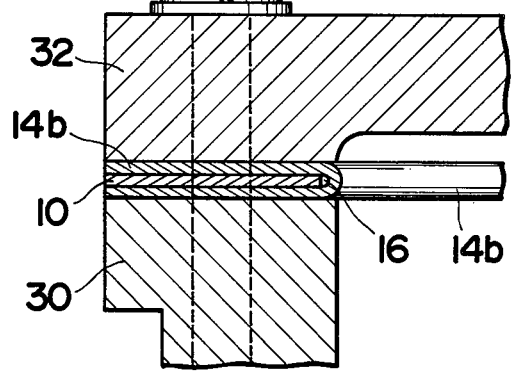
FIG. 7 is a fragmentary sectional view thereof when placed between a cylinder head and a cylinder block.

A gasket shown in FIGS. 5 through 7 comprises the base plate 10 formed with one or a plurality of radially spaced annular ondulations 12 and inserted or sheathed into a surface plate 14b which is U-shaped in cross section, leaving an annular groove 16 between the inner peripheral edge of the base plate 10 and the folded-back portion of the surface plate 14b. The same sealing effect as the gasket shown in FIGS. 1–4 can be obtained and moreover there is an advantage in that, since the base plate 10 and the surface plate 14b are constructed as a unitary member, the handling may be much facilitated.

Figure 8:
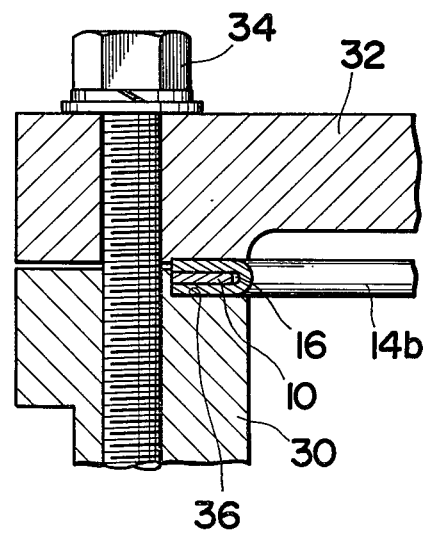
FIG. 8 shows a modification thereof.

In general the gasket is placed as shown in FIG. 7, but it may be modified as shown in FIG. 8. That is, the gasket is placed in a stepped portion 36 of the cylinder block 30a inwardly of the bolts 34. The ondulations 12 may effectively absorb the distortions of the mating surfaces of the cylinder block 30a and the cylinder head 32a when the bolts 34 are tightened, whereby the desired gas-tightness may be attained.

Figure 9:
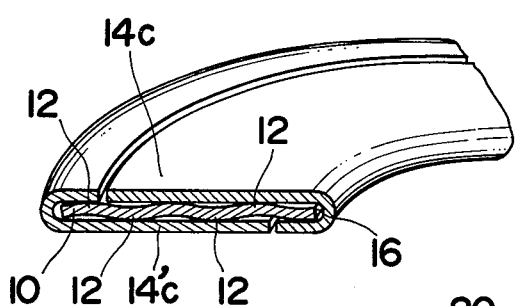
FIG. 9 is a fragmentary view, partly in section, of a fourth embodiment of the present invention.

Fourth Embodiment, FIG. 9

A gasket shown in FIG. 9 is substantially similar in construction to the third embodiment shown in FIGS. 5, 6 and 7 except that the base plate 10 is inserted into surface plates 14c and 14c' having a J-shaped cross sectional configuration. The surface plates 14c and 14c' are firmly pressed against the base plate 10 so that the valley portions defined by the ondulations 12 may be air-tightly sealed. This gasket has an advantage in that it may be placed between mating surfaces having a large area because in addition to the excellent seating effect attained by the provision of the ondulations 12 the folded-back portions, that is, the outer and inner peripheral edges of the surface plates 14c and 14c' may provide independent sealings.

Figure 10:
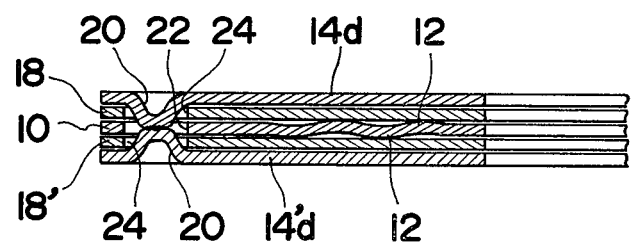
FIG. 10 is a fragmentary cross sectional view of a fifth embodiment of the present invention.

Fifth Embodiment, FIG. 10

The gasket shown in FIG. 10 is similar to the gasket shown in FIGS. 1–3 except that auxiliary plates 18 and 18' are interposed between the base plate 10 and surface plates 14d and 14d'. The auxiliary plates 18 and 18' are punched from a thin metal sheet having a hardness equal to or slightly lower than that of the base plate 10 into a shape the same as or substantially similar to that of the base plate 10. The surface plates 14d and 14d' are punched from a thin metal sheet having a hardness equal to or slightly lower than that of the auxiliary plates 18 and 18' and are formed with upwardly and downwardly directed protrusions 20 at suitable positions. These protrusions 20 are fitted into small holes 22 and 24 formed through the base plate 10 and the auxiliary plates 18 and 18', abutted against each other and joined together by spot welding or the like. Thus the base plate 10, auxiliary plates 18 and 18' and surface plates 14d and 14d' may be provided as a unit.

Under compressive load, the ridges of the ondulations 12 of the base plate 10 are forced to slide over the surfaces of the auxiliary plates 18 and 18' with the hardness equal to or slightly lower than that of the base plate 10, the latter exhibits more elasticity or resistance to compression with the resulting increase in sealing effect.

So far the base plates, surface plates and auxiliary plates have been described as being punched from suitable thin metal sheets, but it will be understood that they may be made of suitable hard rubber or plastics if the gaskets are not subjected to elevated temperatures. Furthermore the combinations of the metal, rubber and plastic base plates, surface plates and auxiliary plates may provide gasket characteristics more suitable for specific service conditions.

What is claimed is:

1. A gasket, comprising
a base plate selected from the group consisting of carbon steel, tool steel and stainless steel being in the form of a hard sheet and having a shape corresponding to the shape of two surfaces between which a seal is to be established, said base plate having two opposite major surfaces at least one of which is provided with at least one corrugation thus being elastically deformable and completely surrounding an opening to be sealed; and at least one surface plate selected from the group consisting of carbon steel, tool steel and stainless steel in the form of a sheet having substantially the same hardness as said base plate and having a shape corresponding to that of said base plate, said surface plate being juxtaposed with said one surface of said base plate and said gasket being able to provide a seal between and to compensate for distortions of the surfaces to be sealed, due to the elastic deformation of said corrugation and to the substantial lack of ductility of said surface plate under pressure exerted by said surfaces upon the gasket.

2. A gasket is defined in claim 1, further comprising an additional sheet metal surface plate similar to the first-mentioned surface plate and being juxtaposed with the other of said major surfaces of said base plate, so that the base plate is sandwiched between said surface plates.

3. A gasket is defined in claim 2, said surface plates each having a J-shaped cross-section and embracing respective opposite lateral edge portions of said base plate from opposite sides of the base plate.

4. A gasket as defined in claim 1, said surface plate having a J-shaped cross-section and embracing one lateral edge of said base plate so as to at least in part overlie the other of said major surfaces of the base plate.

5. A gasket as defined in claim 1, further comprising an additional sheet metal surface plate similar to the first-mentioned surface plate and being juxtaposed with the other of said major surfaces; and a pair of auxiliary sheet metal plates sandwiched between said base plate and respective ones of said surface plates.

* * * * *